United States Patent
Lauser et al.

(10) Patent No.: US 9,327,695 B2
(45) Date of Patent: May 3, 2016

(54) METHOD AND DEVICE FOR THE ELECTRONIC CONTROL OF THE BRAKE FORCE DISTRIBUTION ACCORDING TO THE DIFFERENTIAL SLIP

(71) Applicant: KNORR-BREMESE SYSTEM FÜR NUTZFAHRZEUGE GMBH, München (DE)

(72) Inventors: Wilfried Lauser, Wimsheim (DE); Adnan Mustapha, Maulbronn (DE); Christian Weber, Schwieberdingen (DE); Norbert Leibrand, Muehlacker (DE); Gerhard Wieder, Besigheim (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 14/356,840

(22) PCT Filed: Oct. 30, 2012

(86) PCT No.: PCT/EP2012/071498
§ 371 (c)(1),
(2) Date: May 7, 2014

(87) PCT Pub. No.: WO2013/068281
PCT Pub. Date: May 16, 2013

(65) Prior Publication Data
US 2015/0046057 A1    Feb. 12, 2015

(30) Foreign Application Priority Data
Nov. 10, 2011   (DE) .................. 10 2011 118 130

(51) Int. Cl.
*B60T 7/12*    (2006.01)
*G05D 1/00*    (2006.01)
(Continued)

(52) U.S. Cl.
CPC ............. *B60T 8/17616* (2013.01); *B60T 7/042* (2013.01); *B60T 8/171* (2013.01); *B60T 8/1766* (2013.01); *B60T 8/268* (2013.01); *B60T 8/72* (2013.01); *B60T 13/662* (2013.01); *B60T 13/683* (2013.01)

(58) Field of Classification Search
CPC ......... B60T 8/00; B60T 8/1766; B60T 8/268; B60T 13/66; B60T 2250/02
USPC .................... 701/53, 71, 78, 83, 79
See application file for complete search history.

(56) References Cited

U.S. PATENT DOCUMENTS

| | | | |
|---|---|---|---|
| 5,011,236 A * | 4/1991 | Toepfer .................. | B60T 8/00 303/128 |
| 5,178,231 A * | 1/1993 | Watanabe .......... | B60K 23/0808 180/197 |

(Continued)

FOREIGN PATENT DOCUMENTS

| | | |
|---|---|---|
| CN | 101500867 | 8/2009 |
| DE | 10 2006 045317 | 5/2007 |

(Continued)

OTHER PUBLICATIONS

International Search Report for PCT/EP2012/071498, issued on May 7, 2013.

(Continued)

*Primary Examiner* — Imran Mustafa
(74) *Attorney, Agent, or Firm* — Kenyon & Kenyon LLP

(57) ABSTRACT

A method and device for the electronic control of the brake force distribution according to a differential slip or differential speed between at least one wheel of the front axle and at least one wheel of the rear axle of a vehicle, in which, when a differential slip threshold value or a differential speed threshold value is exceeded by the differential slip or the differential speed, the brake pressure at the rear axle is limited, characterized in that the differential slip threshold value or the differential speed threshold value is determined according to the braking request.

9 Claims, 1 Drawing Sheet

(51) Int. Cl.
*G06F 7/00* (2006.01)
*G06F 17/00* (2006.01)
*B60T 8/1761* (2006.01)
*B60T 7/04* (2006.01)
*B60T 8/1766* (2006.01)
*B60T 13/66* (2006.01)
*B60T 13/68* (2006.01)
*B60T 8/26* (2006.01)
*B60T 8/171* (2006.01)
*B60T 8/72* (2006.01)

(56) References Cited

U.S. PATENT DOCUMENTS

| | | | | |
|---|---|---|---|---|
| 2003/0018425 A1* | 1/2003 | Gronau | ................. | G60T 8/172 |
| | | | | 701/71 |
| 2004/0260446 A1 | 12/2004 | Hamada et al. | | |
| 2005/0182550 A1 | 8/2005 | Matsuura | | |

| | | | | |
|---|---|---|---|---|
| 2009/0134698 A1* | 5/2009 | Herges | ................. | B60T 8/1766 |
| | | | | 303/113.2 |

FOREIGN PATENT DOCUMENTS

| | | |
|---|---|---|
| DE | 102006045317 | 5/2007 |
| EP | 0 357 983 | 3/1990 |
| WO | 03/011664 | 2/2003 |

OTHER PUBLICATIONS

European Patent Office, International Preliminary Report on Patentability, May 13, 2014, from International Patent Application No. PCT/EP2012/071498, filed on Oct. 30, 2012.

English Translation of European Patent Office, International Preliminary Report on Patentability, May 13, 2014, from International Patent Application No. PCT/EP2011/071498, filed on Oct. 30, 2012.

* cited by examiner

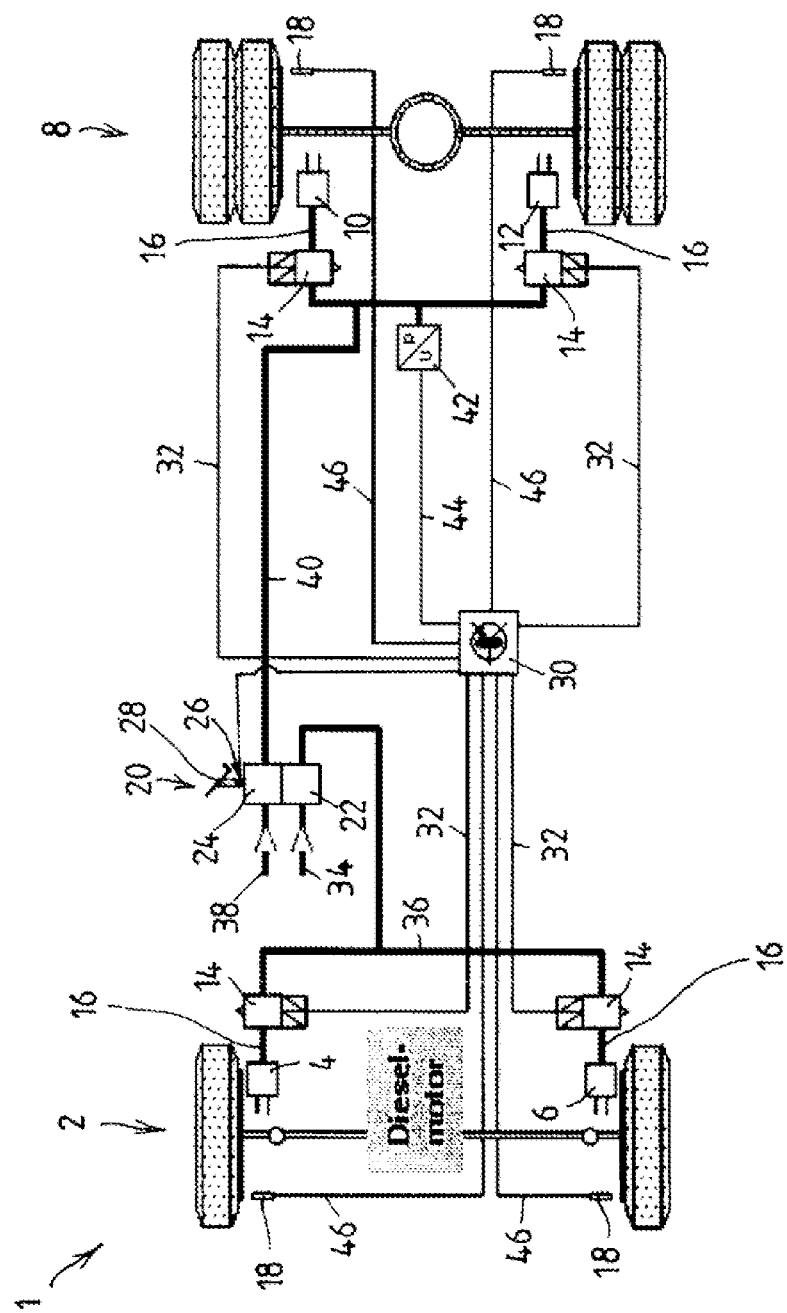

METHOD AND DEVICE FOR THE ELECTRONIC CONTROL OF THE BRAKE FORCE DISTRIBUTION ACCORDING TO THE DIFFERENTIAL SLIP

FIELD OF THE INVENTION

The present invention is based on a method for the electronic control of the brake force distribution according to a differential slip between the front axle and the rear axle of a vehicle, in which, when a differential slip threshold value is exceeded by the differential slip, the brake pressure at the rear axle is limited, and on a device for carrying out the method.

BACKGROUND INFORMATION

In heavy utility vehicles, a diesel engine, which drives the rear axle via a cardan shaft, is generally installed above the front axle. As a result of this arrangement, the load on the rear axle depends greatly on the loading of the utility vehicle. For this reason, the brake force which is applied by the driver via the brake pedal at the rear axle is limited in conventional brake systems by a pneumatic valve with an axial load sensor (ALB, automatically load-dependent brake). This ensures that in the case of an unladen vehicle the entire brake pressure which is desired by the driver is not present at the rear axle, thereby reducing the tendency of the rear axle to lock. Furthermore, a relatively high level of braking comfort is made possible and the service life of the rear axle brake is extended.

In addition to the automatically load-dependent brake (ALB), contemporary utility vehicles have an anti-lock brake system (ABS). This has a rotational speed sensor (inductive sensor) on each wheel, and a pressure control valve which can modulate the pressure set by the driver by the brake pedal. The ABS is activated when there is a tendency of a wheel to lock.

What is referred to as an EBD (electronic brake force distribution) function is discussed in the prior art, for example, DE 10 2006 045 317 A1, said EBD function implementing the automatically load-dependent brake (ALB function) using ABS pressure control valves, therefore eliminating the need for the load valve. Since, in contrast to the automatically load-dependent brake (ALB), the ABS does not have a load sensor, the loading state is determined during braking using the speed difference between the front and rear axles ($v_{VA}$-$v_{HA}$). The lower the rear axle load, the more slip occurs at the rear axle with the same brake activation, i.e. the greater the speed difference $v_{VA}$-$v_{HA}$. The difference between the laden and unladen vehicle has a significantly smaller effect at the front axle because of the arrangement of the engine. The speed difference $v_{VA}$-$v_{HA}$ during braking can therefore be used as a measure for the loading. In other words, during a braking process, EBV shuts off the rear axle brakes, and under certain circumstances also an individual rear wheel, from the further build-up of pressure, depending on the differential slip between the front and rear axles through activating the ABS valves.

However, if the front axle brakes are defective, that is to say the front axle brakes more weakly than normal or even not at all, the speed difference $v_{VA}$-$v_{HA}$ can become very large. The EBD function would then set the ABS valves at the rear axle to "maintaining pressure" and limit the brake pressure at the rear axle. However, in this case the utility vehicle would be underbraked. Furthermore, in the case of a vehicle which is laden only to a very small degree or unladen, the problem arises that the brake pressure control is not very sensitive since in this case the differential slip between the front and rear axles becomes relatively large and a predefined differential slip threshold value is quickly exceeded.

In contrast, the present invention is based on the object of further developing a method of the type mentioned at the beginning in such a way that a more sensitive brake pressure control with at the same time a shorter braking distance is obtained.

This object may be achieved according to the invention by the features described herein.

SUMMARY OF THE INVENTION

The method according to the invention provides that the differential slip threshold value or the differential speed threshold value is determined according to the detected driver braking request. The differential slip threshold value or the differential speed threshold value may be increased as the braking request increases. In other words, in the case of a relatively low driver braking request, a relatively small differential slip threshold value is set, and, in the case of a relatively large braking request, a relatively large differential slip threshold value is set.

The device according to the invention for the electronic control of the brake force distribution according to a differential slip or differential speed between at least one wheel of the front axle and at least one wheel of the rear axle of a vehicle comprises:
 a sensor for measuring the wheel speeds of the wheel of the front axle,
 a sensor for measuring the wheel speeds of the wheel of the rear axle,
 an electronic control device for calculating a differential slip or a differential rotational speed between the at least one wheel of the front axle and the at least one wheel of the rear axle, wherein
 the electronic control device is embodied in such a way that, when a differential slip threshold value or a differential speed threshold value is exceeded by the differential slip or by the differential speed, the brake pressure at the rear axle is limited, and wherein
 a brake value transmitter for generating a signal which is dependent on a braking request is provided, and the electronic control device is also embodied in such a way that it determines the differential slip threshold value or the differential speed threshold value according to the signal of the brake value transmitter which represents the braking request.

As already explained at the beginning, when the differential slip threshold value or the differential speed threshold value is exceeded by the currently present differential slip or the currently present differential speed, the brake pressure at the rear axle is limited, i.e. is limited with respect to a relatively high value which is predefined in accordance with the driver braking request.

On the one hand, an ALB function in the sense described above therefore continues to be implemented using the ABS pressure control valves without a load valve being necessary or used for this. On the other hand, the braking request is additionally taken into account by the driver, with the result that, in the case of partial braking operations (low braking request) in the unladen state, relatively small differential slip threshold values are predefined and therefore it is possible to perform control and braking more sensitively. This is advantageous in particular because most braking operations are partial braking operations with a low braking request.

The information about the braking request by the driver is therefore required in order to detect whether it is necessary to increase the brake pressure at the rear axle, for example in the case of the front axle which is not being braked, even though an increase in the brake pressure at the rear axle would actually be prohibited owing to the speed difference $v_{VA}$-$v_{HA}$ or slip difference.

The control logic is therefore configured in such a way that, during normal braking with a low or a medium braking request and in the case of a vehicle which is laden to a small degree or is unladen, an intervention takes place before the ABS control starts at the rear axle. Strong braking operations are determined by the detected driver braking request. A more sensitive transition to the ABS control is ensured through corresponding adaptation of the differential slip thresholds according to the detected driver braking request.

The braking request by the driver can be detected by various sensors, for example by a pressure sensor in a pneumatic brake circuit, by an electrical signal of an electric brake value transmitter in a digital foot brake module or a corresponding signal of the vehicle CAN bus can also be evaluated.

Consequently, advantages of the method according to the invention can be considered to be sensitive graduation of the brake or brake control in the case of unladen vehicles through an early start of control and the build-up of the maximum brake pressure in the case of full activation of the brake value transmitter.

Since this additional function is implemented in software and only uses hardware which is already present in any case within the scope of the ABS function such as wheel speed sensors and pressure control valves, wherein only a brake value transmitter is still necessary, this function can be implemented cost-effectively. In particular, it is easily possible to retrofit an existing brake device with an EBD function and therefore to replace the ALB function.

Furthermore, the efficiency of the brake system is used better if, for example, the front axle brakes fail during a braking operation. This is because the system then increases the differential slip threshold value or the differential speed threshold value in the case of a correspondingly high braking request.

Not least, the signal which is absolutely necessary to implement the function according to the invention and which represents the braking request by the driver can also be utilized to improve the control of the ABS.

More precise details can be found in the following description of an exemplary embodiment.

An exemplary embodiment of the invention is illustrated below in the drawing and explained in more detail in the following description.

The FIGURE shows a schematic circuit diagram of a pneumatic brake device of a utility vehicle according to an exemplary embodiment of the invention.

DETAILED DESCRIPTION

A pneumatic brake device denoted for example by 1 in the FIGURE, vehicles, in particular utility vehicles, has two pneumatic brake cylinders 4, 6 on a vehicle front axle 2, and two pneumatic brake cylinders 10, 12 on the vehicle rear axle 8. The utility vehicle has, for example, a diesel engine as a front-mounted engine which drives the wheels of the rear axle 8 via a cardan shaft (not shown here). The brake cylinders 4, 6, 10, 12 are each assigned a pressure control valve arrangement 14 which serves to modulate the brake pressure, here, in particular, embodied as an ABS pressure control valve for reducing, maintaining and increasing the pressure. The latter are each connected to the respective brake cylinder 4, 6, 10, 12 by a brake line 16. Alternatively, the brake device 1 could also be an electro-pneumatic brake device or an electronic brake system (EBS) with pressure control modules as the pressure control arrangement.

In addition, a wheel speed sensor 18 for monitoring the wheel rotational behavior is connected to each of the wheels of the two vehicle axials 2, 8. The brake device 1 is therefore designed for brake slip-dependent and/or drive slip-dependent brake pressure modulation. The brake device 1 is also equipped with a brake value transmitter 20 which has two pneumatic channels 22 and 24 here as well as, for example, an electric potentiometer 26 for generating an electrical signal which is dependent on activation of a foot brake pedal 28 of the brake value transmitter 26 or on the braking request.

An electronic control device 30 of the brake device 1 is connected via a line network 32 to the pressure control valve arrangements 14 of the two axials 2, 8. The two pneumatic channels 22 and 24 of the brake value transmitter 20 are, in terms of their design, commercially available, dual-circuit service brake valves. The pneumatic front axle channel 22 of the brake value transmitter 20 is connected on the energy inflow side to a supply line 34 which is connected to a compressed air supply (not shown here) and on the energy outflow side to the pressure control valves 14 of the front axle 2 by a control line 36. The pneumatic rear axle channel 24 is connected to a compressed air supply (not shown either) by a supply line 38, and to the pressure control valves 14 of the rear axle 8 by a control line 40. Therefore, a front axle channel and a rear axle channel of the pneumatic brake device 1 of the vehicle can be controlled with the pneumatic channels 22 and 24 of the brake value transmitter 20. In addition, a pressure sensor 42 can be installed in the control line 40 of the rear axle channel, which pressure sensor 42 transmits an electrical pressure signal to the electronic control device 30 via an electrical signal line 44, said pressure signal also representing the braking request of the driver. However, this pressure sensor 42 is not absolutely additionally necessary to detect the braking request of the driver. Instead, the wish of the driver to brake can be detected by the potentiometer 26 or by the pressure sensor 42 or by another sensor. For example, a signal which represents the braking request of the driver and which is conducted on a CAN of the vehicle is also conceivable. However, it is also possible to detect the braking request of the driver redundantly, as described here in the exemplary embodiment, by signals of the potentiometer 26 or of the pressure sensor 42.

The control device 30 is designed that the brake force distribution between the brakes 4, 6 of the front axle 2 and the brakes 10, 12 of the rear axle 8 may occur according to a differential speed $v_{VA}$-$v_{HA}$ between the wheel speeds $v_{VA}$ of the wheels of the front axle 2 and the wheel speeds $v_{HA}$ of the wheels of the rear axle 8. For this purpose, the control device 30 receives signals indicating the wheel speeds of the wheels of the front axle 2 and signals indicating the wheel speeds of the wheels of the rear axle 8 in each case from the assigned wheel speed sensors 18 which are connected to the control device 30 via a further line network 46.

The differential speed $v_{VA}$-$v_{HA}$ between the wheel speeds $v_{VA}$ of the wheels of the front axle 2 and the wheel speeds $v_{HA}$ of the wheels of the rear axle 8 is then calculated in the electronic control device 30 from the signals of the wheel speed sensors 18. The electronic control device 30 comprises implemented control routines which, when a differential speed threshold value is exceeded by the differential speed $v_{VA}$-$v_{HA}$, limit the brake pressure in the brake cylinders 10, 12 of the rear axle 8. In this context, the electronic control device determines the differential speed threshold value according to the respective braking request which is defined by the driver and which is represented here, for example, by the signal of the potentiometer 26 of the brake value transmitter 20 or the pressure signal of the pressure sensor 42. In particular, the differential speed threshold value is increased as the braking request increases. In the case of a relatively low braking request by the driver, a relatively small differential speed threshold value is therefore set, and, in the case of a relatively large braking request, a relatively large differential speed threshold value is set.

Therefore, by using the ABS pressure control valves 14, it is possible to implement the ALB function mentioned at the beginning without a load valve being necessary or used for this purpose. In addition, the braking request of the driver is taken into account so that, in the case of partial braking operations with a low to medium braking request in the unladen state, relatively small differential speed threshold values are predefined and therefore more sensitive control and braking can be carried out.

The information about the braking request of the driver which is supplied by the brake value transmitter 20 or by the potentiometer 26 thereof or by the pressure sensor 42 is therefore required in order to determine whether an increase in the brake pressure has to be performed at the rear axle 8 even though an increase in brake pressure at the rear axle 8 would actually have to be prohibited owing to the differential speed $v_{VA}$-$v_{HA}$. This is significant in particular for the case in which the front axle brakes have failed and during braking the differential speed $v_{VA}$-$v_{HA}$ is therefore relatively high. In the case of a high braking request by the driver, which is communicated to the electronic control device 30 by a corresponding signal of the potentiometer 26 of the brake value transmitter 20 or of the pressure sensor 42, the differential speed threshold value is then increased in order to prevent the brake pressure at the brakes 10, 12 of the rear axle 8 being prematurely limited.

The slip values at the wheels of the front axle 2 or of the rear axle 8 with respect to the underlying surface can also be monitored on the basis of the measured wheel speeds and then a differential slip can be calculated in the control device 30 or a differential slip threshold value can be determined. In this case, the differential slip threshold value is determined as a function of the detected driver braking request, and, in particular, increased as the braking request increases.

The list of reference numbers is as follows:
1 Brake device
2 Front axle
4 Brake cylinder
6 Brake cylinder
8 Rear axle
10 Brake cylinder
12 Brake cylinder
14 Pressure control valve
16 Brake line
18 Wheel speed sensor
20 Brake value transmitter
22 Front axle channel
24 Rear axle channel
26 Potentiometer
28 Foot brake pedal
30 Control device
32 Line network
34 Supply line
36 Control line
38 Supply line
40 Control line
42 Pressure sensor
44 Signal line
46 Line network

The invention claimed is:

1. A method for electronically controlling the brake force distribution according to a differential slip or differential speed between at least one wheel of the front axle and at least one wheel of the rear axle of a vehicle, the method comprising:
   measuring, via a first sensor, wheel speeds of the wheel of the front axle;
   measuring, via a second sensor, wheel speeds of the wheel of the rear axle;
   limiting, via an electronic control device for determining the differential slip or the differential speed between the at least one wheel of the front axle and the at least one wheel of the rear axle, when a differential slip threshold value or a differential speed threshold value is exceeded by the differential slip or the differential speed, the brake pressure at the rear axle;
   generating, via a brake value transmitter or a pressure sensor, a signal which is dependent on a braking request; and
   determining, via the electronic control device, the differential slip threshold value or the differential speed threshold value according to the braking request;
   wherein for a low braking request by the driver, a small differential speed threshold value is set, and, for a large braking request, a large differential speed threshold value is set.

2. The method of claim 1, wherein the differential slip threshold value or the differential speed threshold value is increased as the braking request increases.

3. A non-transitory computer readable medium having a computer program, which is executable by a processor, comprising:
   a program code arrangement having program code for controlling the brake force distribution according to a differential slip or differential speed between at least one wheel of the front axle and at least one wheel of the rear axle of a vehicle, by performing the following:
      measuring, via a first sensor, wheel speeds of the wheel of the front axle;
      measuring, via a second sensor, wheel speeds of the wheel of the rear axle;
      limiting, via an electronic control device for determining the differential slip or the differential speed between the at least one wheel of the front axle and the at least one wheel of the rear axle, when a differential slip threshold value or a differential speed threshold value is exceeded by the differential slip or the differential speed, the brake pressure at the rear axle;
      generating, via a brake value transmitter or a pressure sensor, a signal which is dependent on a braking request; and
      determining, via the electronic control device, the differential slip threshold value or the differential speed threshold value according to the braking request;
   wherein for a low braking request by the driver, a small differential speed threshold value is set, and, for a large braking request, a large differential speed threshold value is set.

4. A device for electronically controlling the brake force distribution according to a differential slip or differential speed between at least one wheel of the front axle and at least one wheel of the rear axle of a vehicle, comprising:
   a first sensor for measuring wheel speeds of the wheel of the front axle;
   a second sensor for measuring wheel speeds of the wheel of the rear axle;

an electronic control device for determining a differential slip or a differential rotational speed between the at least one wheel of the front axle and the at least one wheel of the rear axle, wherein the electronic control device is configured so that when a differential slip threshold value or a differential speed threshold value is exceeded by the differential slip or by the differential speed, the brake pressure at the rear axle is limited; and a brake value transmitter or a pressure sensor for generating a signal which is dependent on a braking request;

wherein the electronic control device is further configured so that it determines the differential slip threshold value or the differential speed threshold value according to the signal of the brake value transmitter which represents the braking request, and wherein for a low braking request by the driver, a small differential speed threshold value is set, and, for a large braking request, a large differential speed threshold value is set.

5. The device of claim 4, wherein the electronic control device is further configured so that it increases the differential slip threshold value or the differential speed threshold value as the braking request increases.

6. The device of claim 4, wherein the brake value transmitter generates an electrical signal for the control device which is dependent on activation of a brake pedal.

7. The device of claim 4, wherein for a high braking request by the driver, which is communicated to the electronic control device by a corresponding signal of the brake value transmitter or the pressure sensor, the differential speed threshold value is increased to prevent the brake pressure at the brakes of the rear axle from being prematurely limited.

8. The method of claim 1, wherein for a high braking request by the driver, which is communicated to the electronic control device by a corresponding signal of the brake value transmitter or the pressure sensor, the differential speed threshold value is increased to prevent the brake pressure at the brakes of the rear axle from being prematurely limited.

9. The computer readable medium of claim 3, wherein for a high braking request by the driver, which is communicated to the electronic control device by a corresponding signal of the brake value transmitter or the pressure sensor, the differential speed threshold value is increased to prevent the brake pressure at the brakes of the rear axle from being prematurely limited.

* * * * *